July 3, 1956 W. L. TANCRED 2,753,111
ACTUATOR-ACCUMULATOR ENGAGING AND DISENGAGING MECHANISMS
Filed Aug. 18, 1949 10 Sheets-Sheet 1
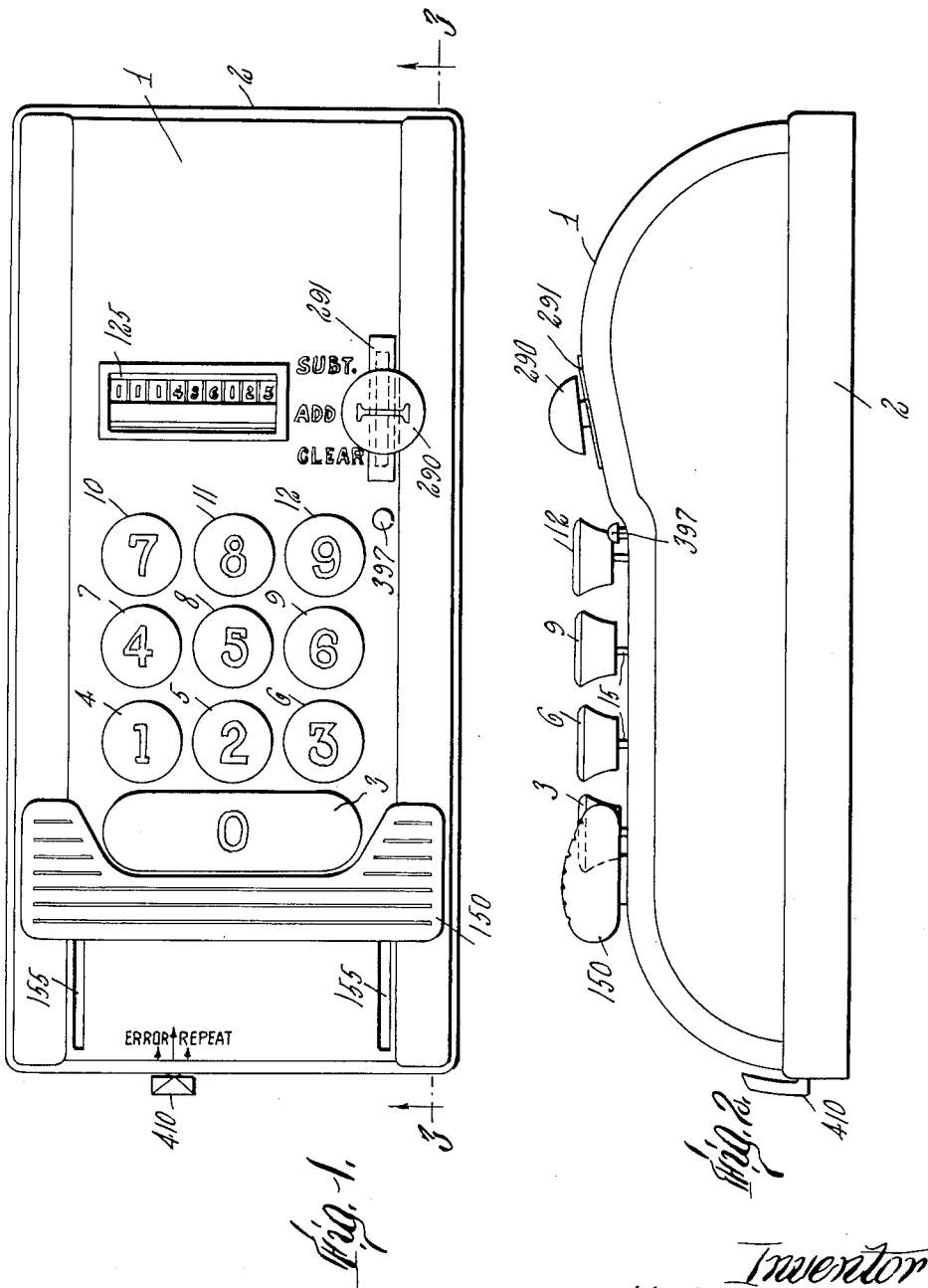

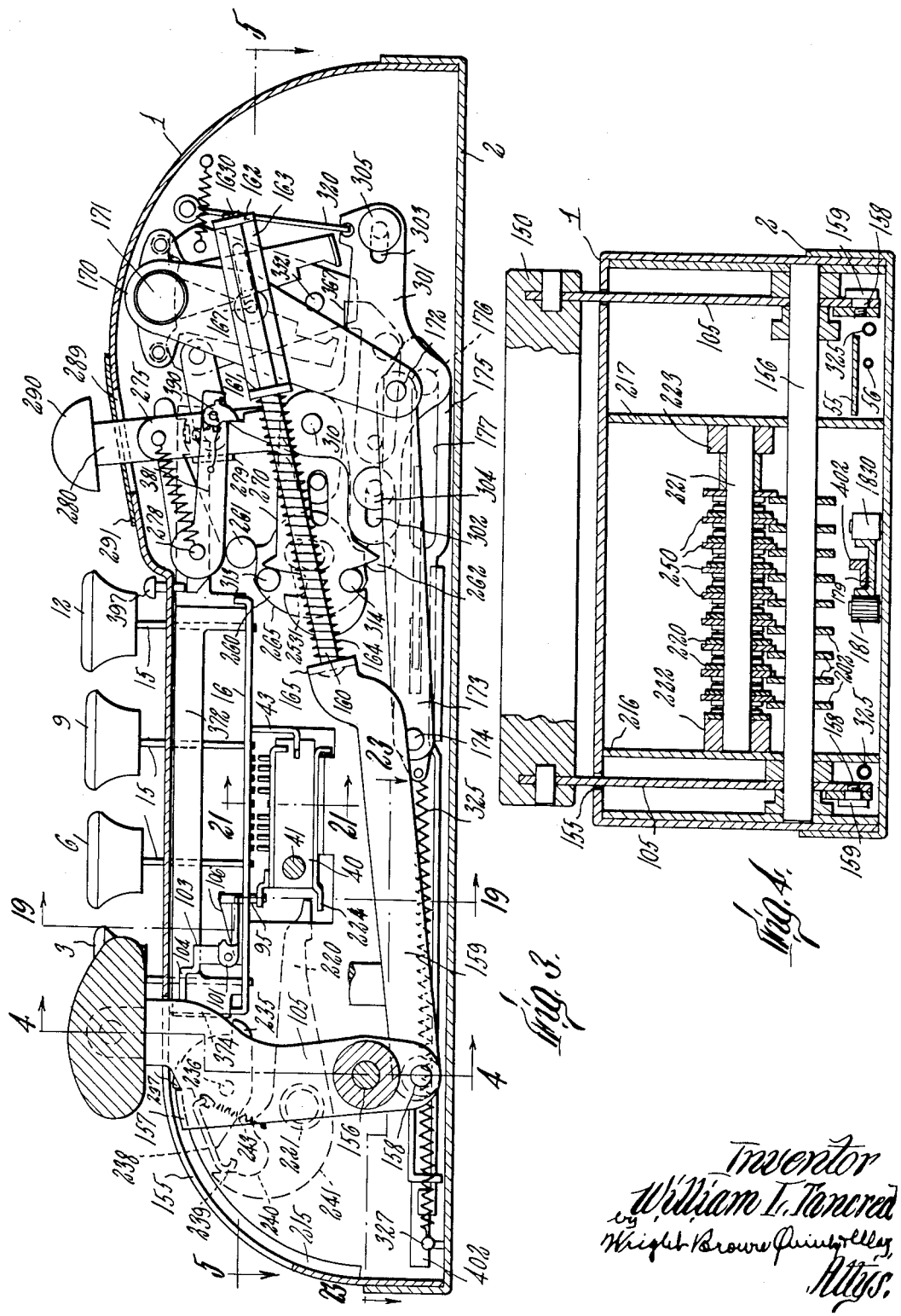

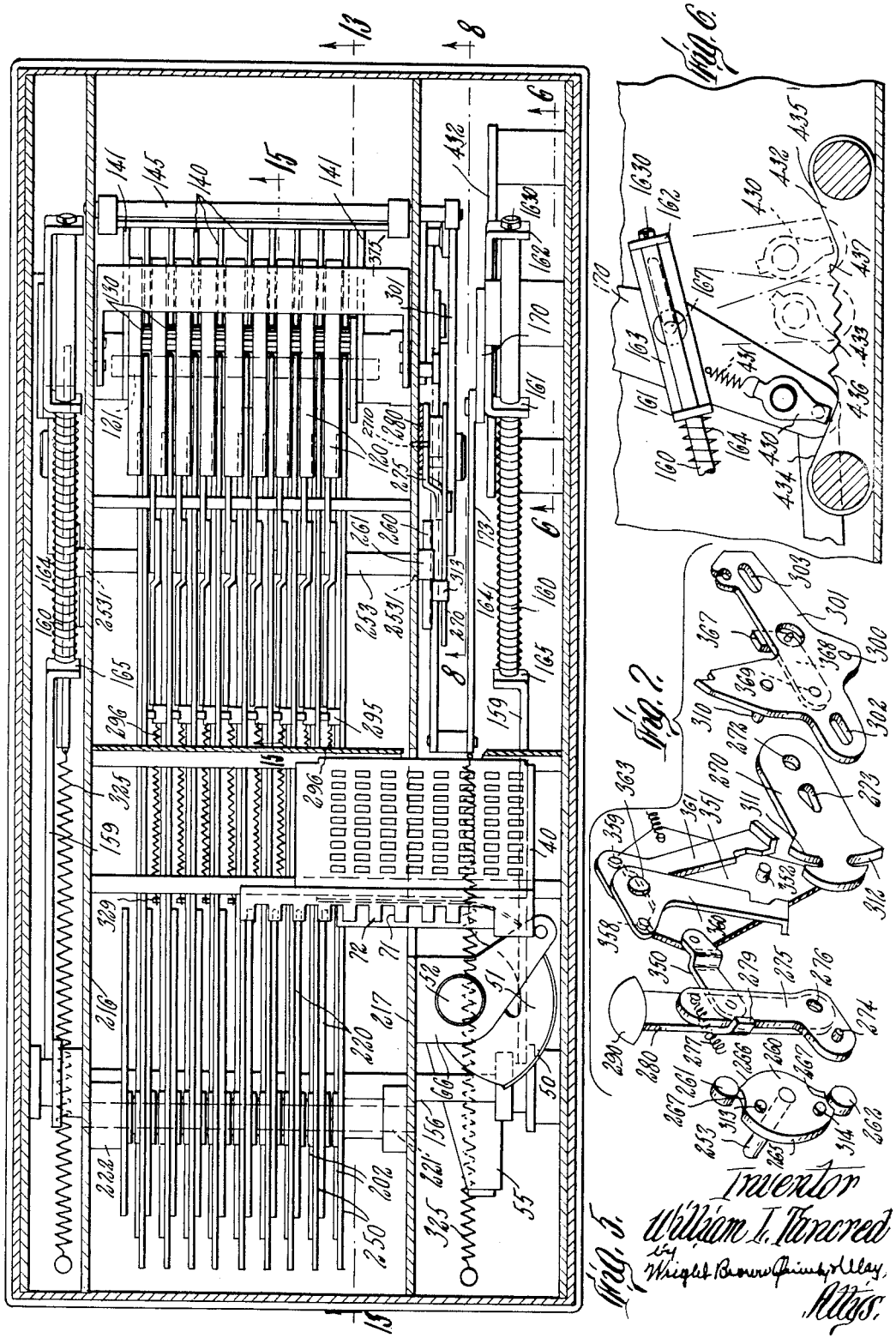

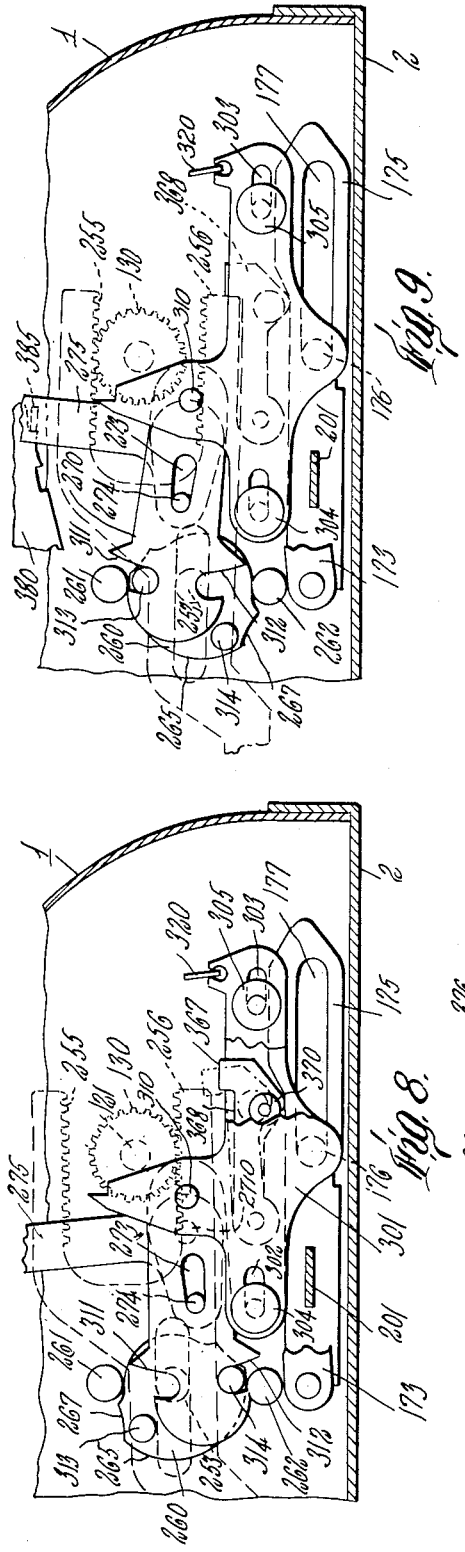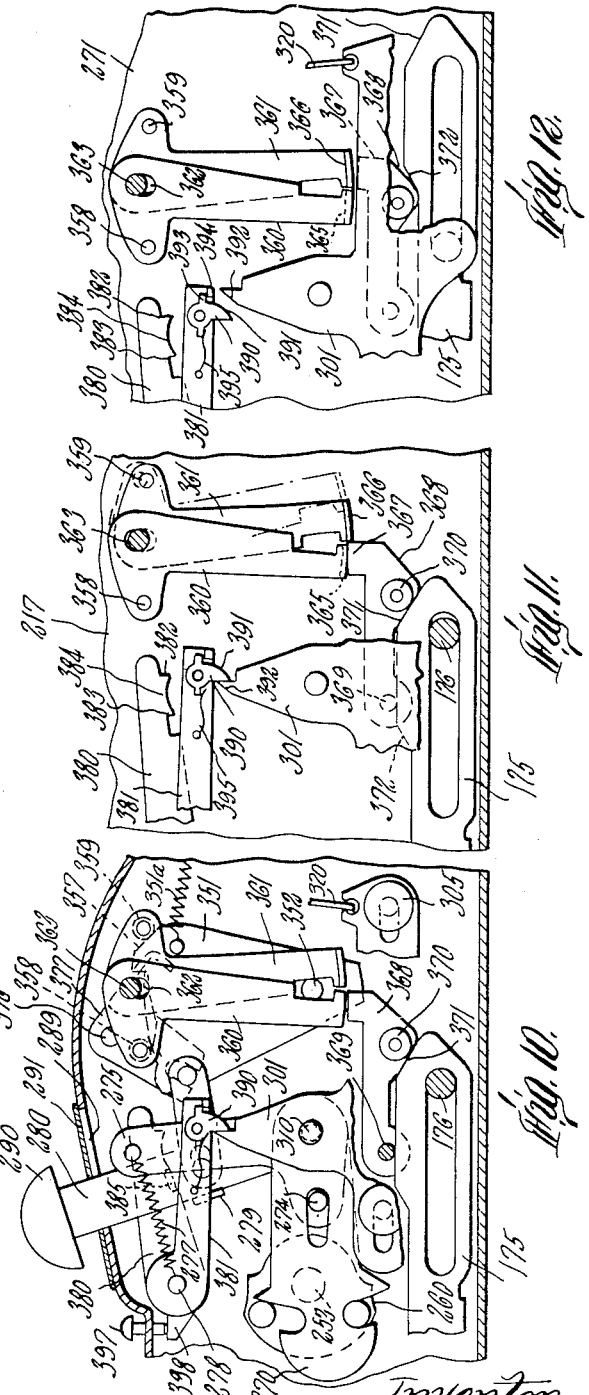

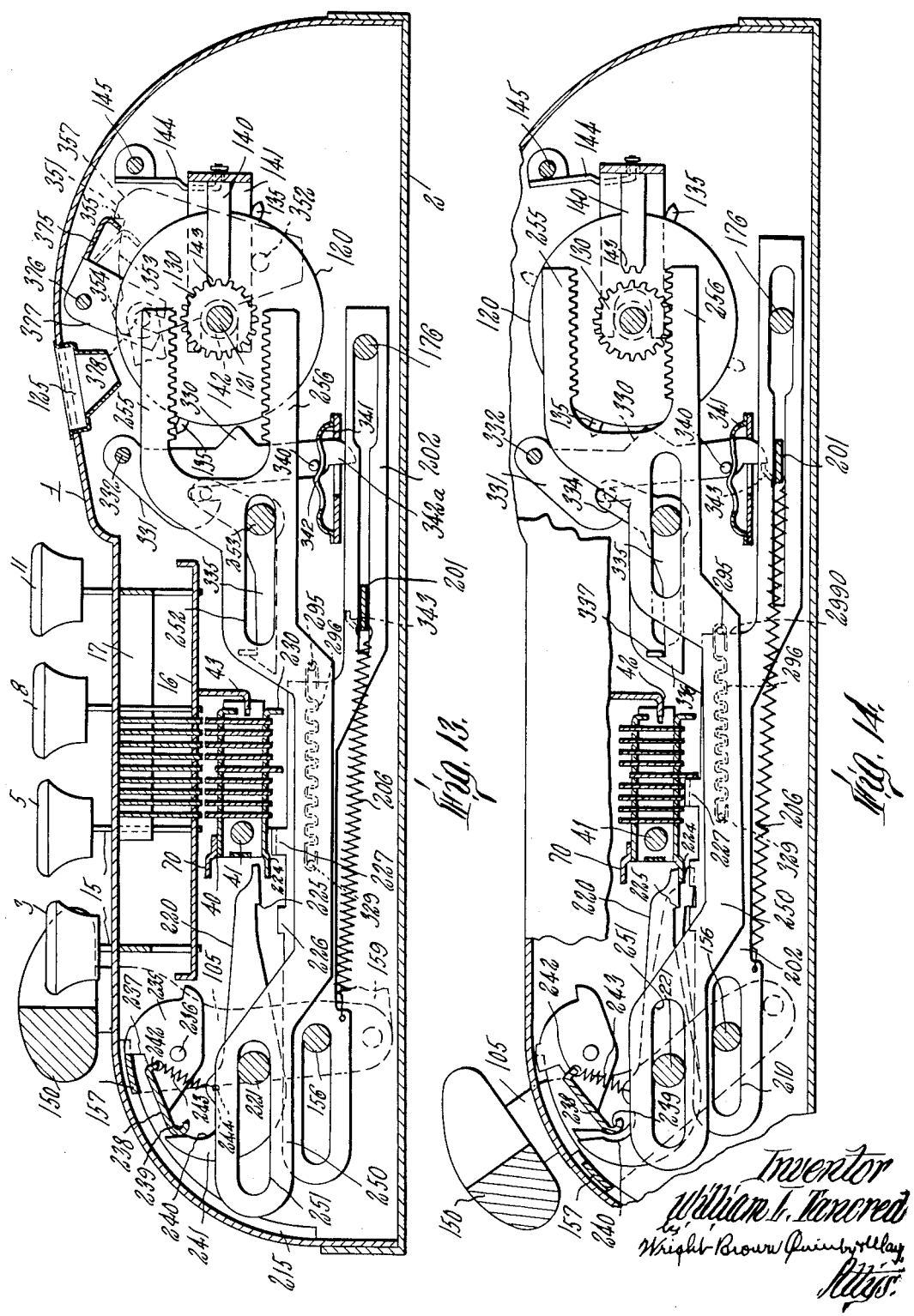

July 3, 1956
W. L. TANCRED
2,753,111
ACTUATOR-ACCUMULATOR ENGAGING AND DISENGAGING MECHANISMS
Filed Aug. 18, 1949
10 Sheets-Sheet 6
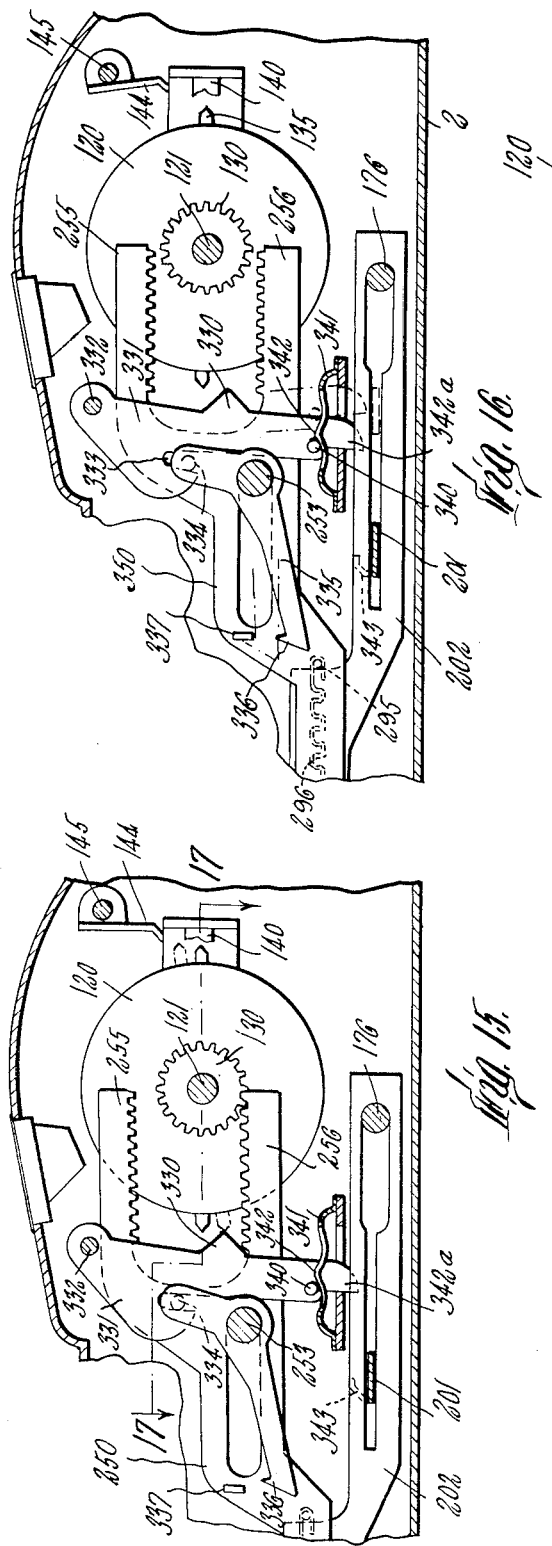
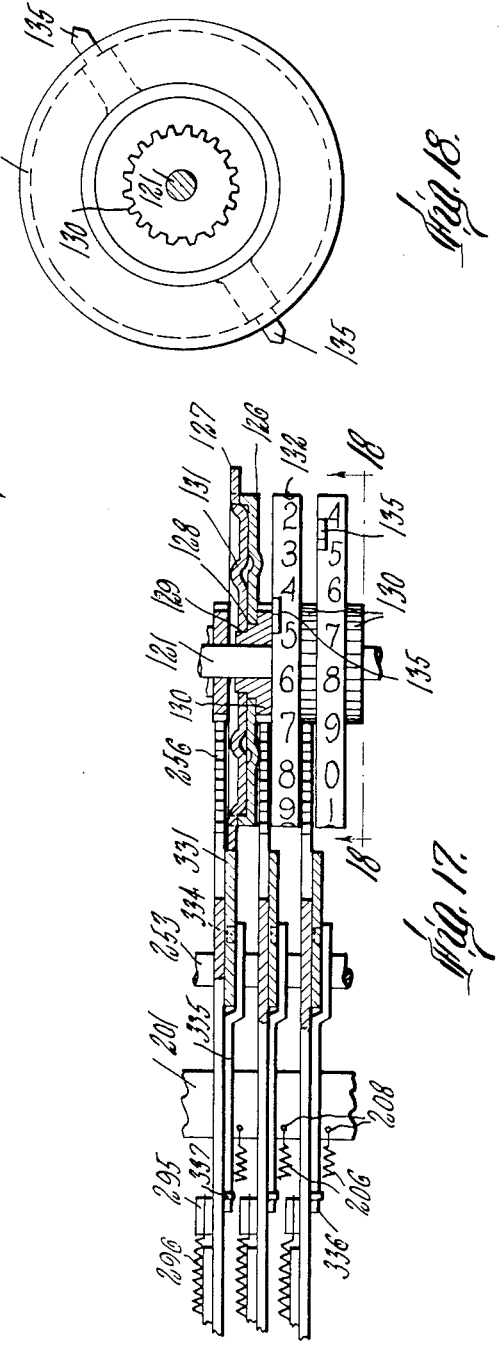

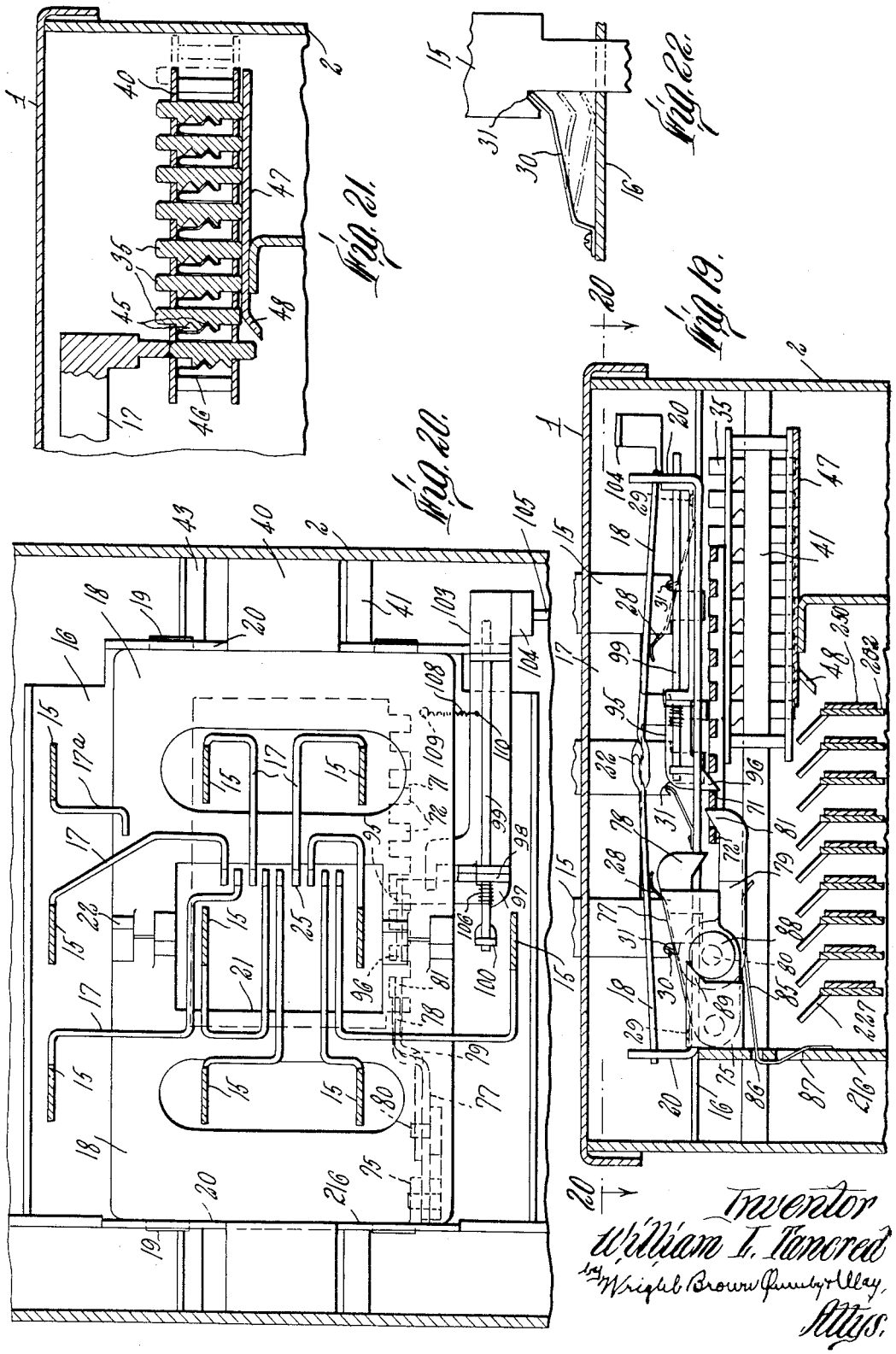

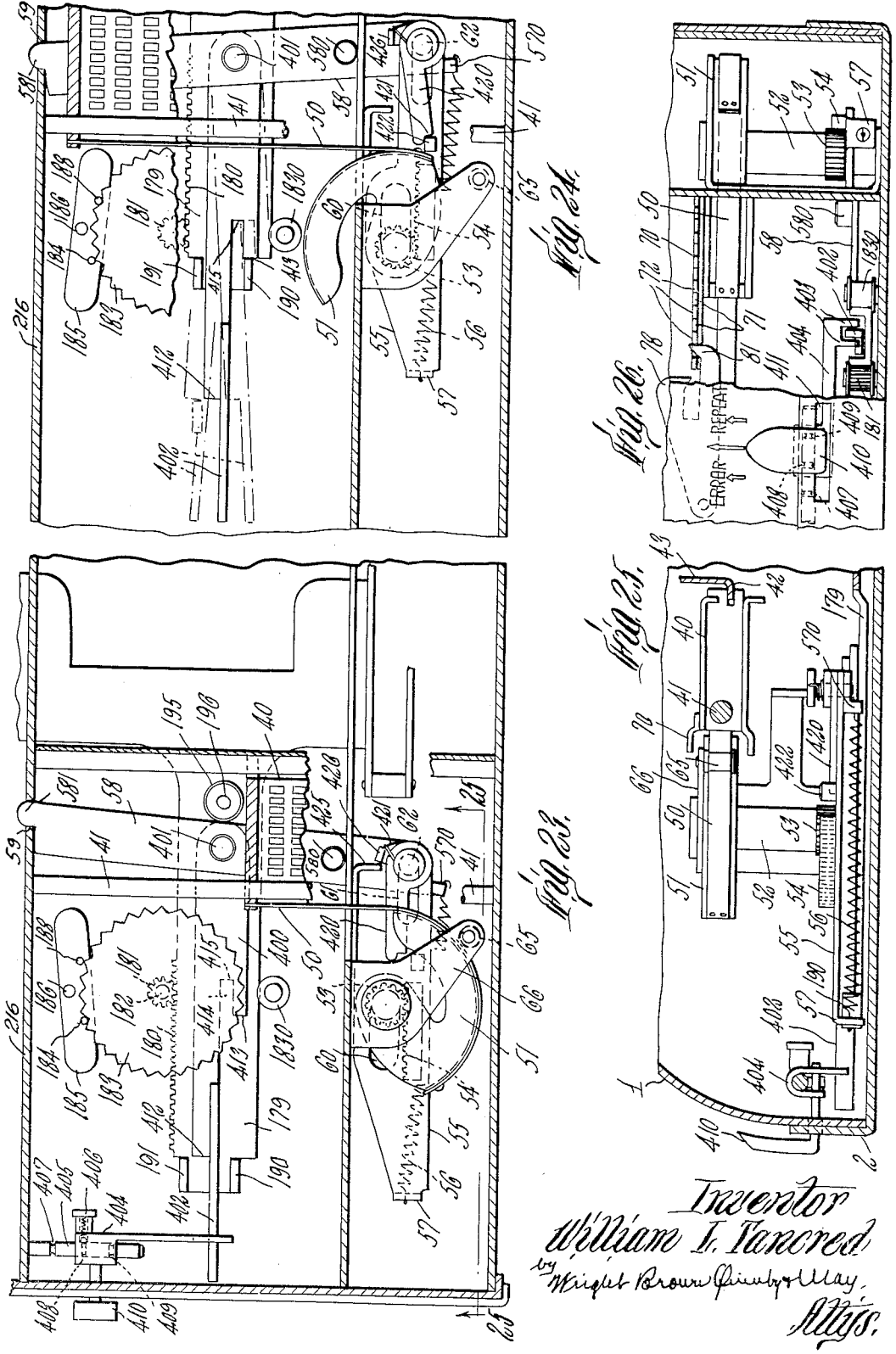

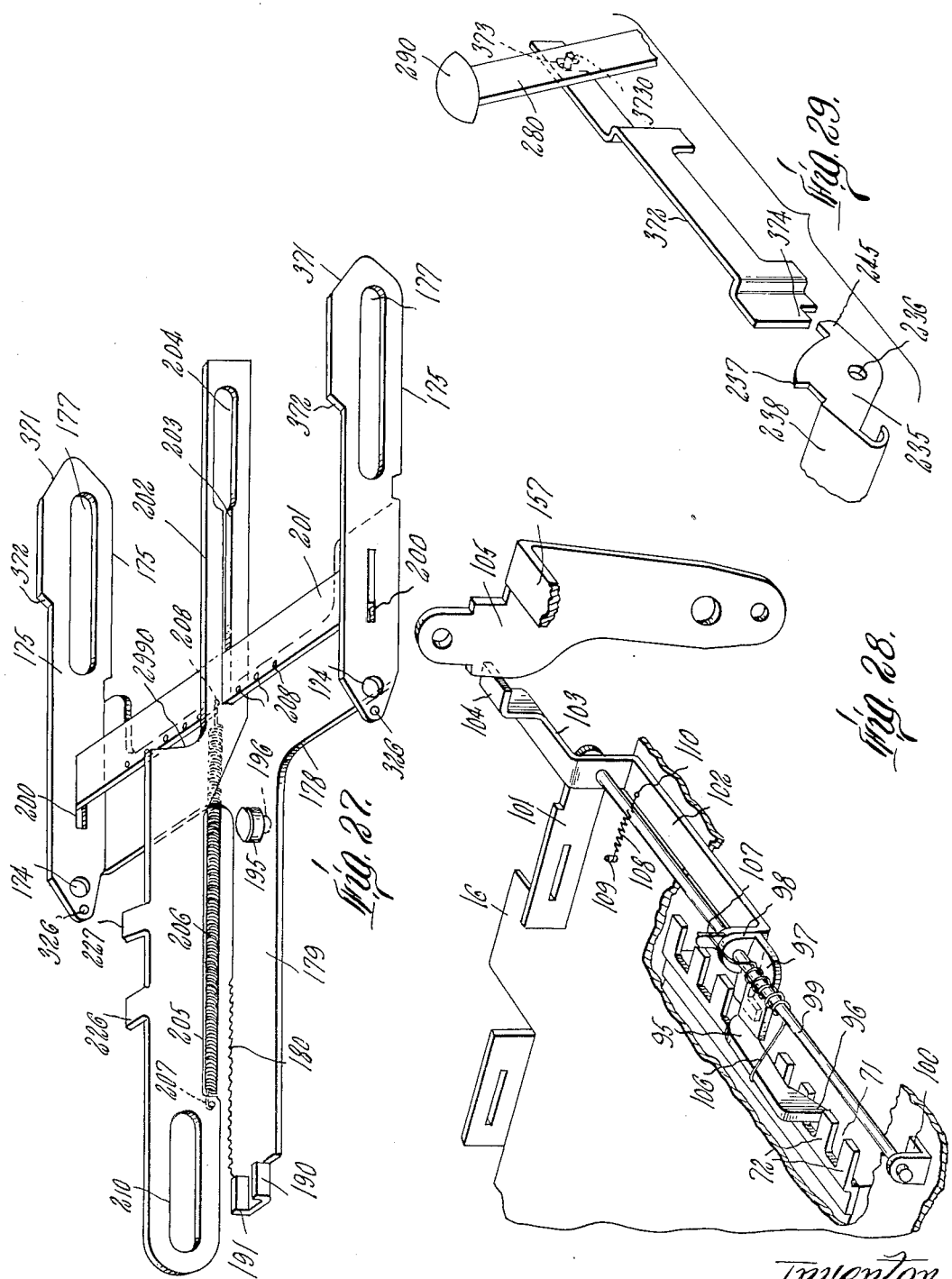

July 3, 1956     W. L. TANCRED     2,753,111
ACTUATOR-ACCUMULATOR ENGAGING AND DISENGAGING MECHANISMS
Filed Aug. 18, 1949     10 Sheets-Sheet 10
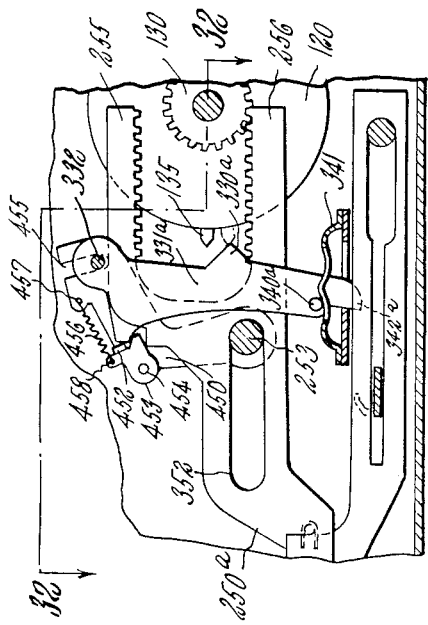
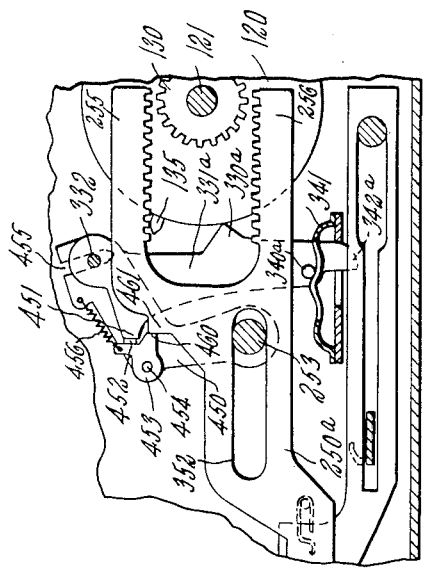
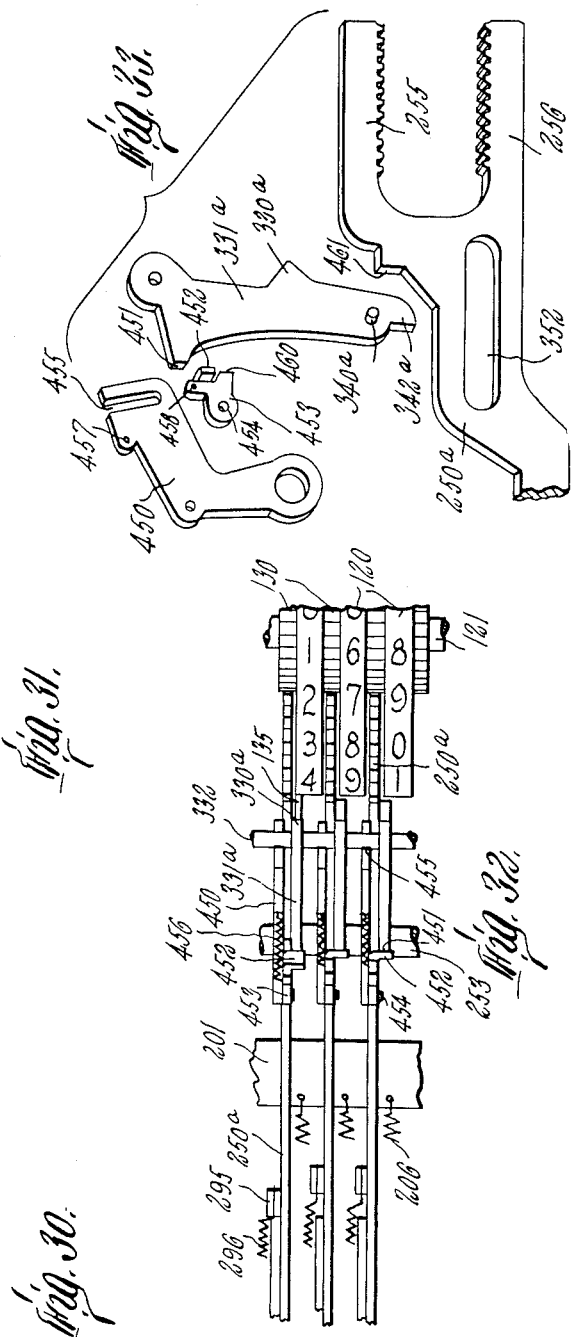
Inventor
William L. Tancred
by Wright, Brown, Quinby & May
Attys.

United States Patent Office 2,753,111
Patented July 3, 1956

2,753,111

ACTUATOR-ACCUMULATOR ENGAGING AND DISENGAGING MECHANISMS

William L. Tancred, Hartford, Conn., assignor, by mesne assignments, to John H. Reid, Hartford, Conn., and W. Sidney Felton, Salem, Mass., as trustees Application August 18, 1949, Serial No. 110,980

7 Claims. (Cl. 235—60)

This invention relates to computing machines, and more particularly to machines for performing addition and subtraction.

One object of the invention is to provide such a machine of small size and weight so that it is easily carried about.

A further object is to provide such a machine which may be operated by either hand.

Still another object is to provide such a machine wherein the totalizing mechanism does not change its elevation in the casing during operation of the machine.

Another object is to provide against lateral bending stresses in the stampings which constitute a major portion of the movable elements of the machine.

A further object is to avoid as much as possible the use of load and fire mechanisms which tend to produce sudden and extreme inertia forces.

Still another object is to simplify and reduce the number of parts.

A further object is to provide for sub-assemblies of parts into groups which may be separately assembled and then associated together in the complete machine which makes for ease and simplicity in effecting repairs.

A further object is to improve the actuating mechanisms for the transversely moving selector stop carriage.

Another object is to provide means for preventing accidental back-up motion of the carriage such as might be due to rough handling or accidents to the machine.

A further object is to provide for balanced motion at opposite sides of the under-carriage while operating the totalizer mechanism.

Another object is to provide a single control mechanism for "error" and for "repeat."

A further object is to provide means which eliminates sticking of the number keys, assists full return of the keys, and provides for uniform stroke of the keys.

Still another object is to provide means for limiting the speed of motion of parts so that they will not over-travel or produce inertia shocks and which at the same time produce a small vibration which tends to prevent sticking of movable parts.

Still another object is to provide means which imparts a "feel" to the operator when any of the number keys is depressed, the "feel" indicating to the operator when a full stroke of the key has been produced.

Further objects and advantages will appear from a description of an embodiment of the invention shown in the accompanying drawings in which Figures 1 and 2 are top plan and right side elevational views, respectively, of a machine embodying the invention.

Figure 3 is a vertical sectional view on line 3—3 of Figure 1.

Figures 4 and 5 are detail sectional views on lines 4—4 and 5—5, respectively, of Figure 3.

Figures 6 and 8 are detail sectional views on lines 6—6 and 8—8, respectively, of Figure 5, Figure 8 showing the totalizer parts in adding relation.

Figure 7 is a fragmentary exploded perspective view of certain parts of the totalizer actuating mechanism.

Figures 9 and 10 are views somewhat similar to Figure 8, but showing certain parts of the totalizer actuating mechanism in "subtracting" and "clearing" relations, respectively.

Figures 11 and 12 are views similar to Figure 10, but with parts omitted or broken away, the parts shown being in successive positions after the positions shown in Figure 10 during a "clearing" operation.

Figure 13 is a longitudinal sectional view on lines 13—13 of Figure 5, the parts being shown in neutral or starting position.

Figure 14 is a fragmentary view similar to a portion of Figure 13 but showing the actuating parts at the start of an adding operation on a totalizing wheel.

Figure 15 is a detail sectional view on line 15—15 of Figure 5, the actuating parts being shown at the end of an adding action on a totalizer wheel with a carry-over.

Figure 16 is a fragmentary view similar to a portion of Figure 15, but with the actuating parts in neutral positions.

Figure 17 is a detail sectional view on line 17—17 of Figure 15 showing three totalizer wheels with certain of their actuating parts, one of the totalizing wheels being shown in section.

Figure 18 is a detail sectional view on line 18—18 of Figure 17.

Figure 19 is a fragmentary sectional view on line 19—19 of Figure 3.

Figure 20 is a fragmentary sectional view on line 20—20 of Figure 19.

Figure 21 is a detail sectional view on line 21—21 of Figure 3.

Figure 22 is a fragmentary view to a larger scale partly in elevation and partly in section of one of the number keys and its spring.

Figure 23 is a fragmentary sectional view with parts broken away on line 23—23 of Figure 3, the selector stop carriage being shown at the starting of an adding or subtracting operation.

Figure 24 is a view similar to a portion of Figure 23, but showing the selector stop carriage at its final limit of motion as when a series of actuating number keys equal in number to the totalizing wheels have been depressed.

Figure 25 is a detail sectional view on line 25—25 of Figure 23.

Figure 26 is a fragmentary view partly in front end elevation and partly broken away and in section and showing mechanism also appearing in Figure 25.

Figure 27 is a perspective view of the undercarriage and spring bar and one of the totalizer rack pilot bars.

Figure 28 is a fragmentary perspective view of a portion of the selector stop carriage and related part showing the safety catch for the carriage.

Figure 29 is a fragmentary perspective view showing the release retaining mechanism effective in the "clear" adjustment.

Figure 30 is a view similar to a portion of Figure 13, but showing a modified carry-over mechanism.

Figure 31 is a view similar to Figure 15, but showing the same mechanism as Figure 30.

Figure 32 is a view similar to Figure 17, but showing the carry-over mechanism of Figures 30 and 31.

Figure 33 is a fragmentary exploded perspective view of certain of the parts in the modified carry-over mechanism of Figures 30 to 32, inclusive.

Number selecting mechanism

Projecting through the cover member 1 the machine casing 2 are ten selector keys 3, 4, 5, 6, 7, 8, 9, 10, 11 and 12 which correspond to the digits zero to 9 inclusive, Each of these keys has a shank 15 which extends slidably through the casing 1 and through slots in a transverse partition 16. Referring to Figures 19 and 20, each of these shanks beneath the cover 1 is provided with a lateral arm 17 which extends over one or the other of a pair of hinged equalizer plates 18. These plates 18 are provided with ears 19 along their remote edges which extend through slots in flanges 20 upstanding from the transverse partitions 16. These plates 18 are cut away centrally as at 21 and at opposite sides of the cut away portion they overlap in sliding hinge formation at 22.

The extremities of all of the arms 17 are brought into an alined series as at 25, except that extending from the key 12 representing the digit 9. The extremity of this arm 17a terminates above one of the plates 18. The mating edges of the plates 18 are normally held elevated against the under edges of the various arms 17 as by suitable leaf springs 28, the lower ends of which are secured to the top face of the partition 16 as by rivets 29 (see Figure 19).

Each of the keys may be held normally elevated as by a leaf spring 30 supported at one end on the partition 16 and at the other end engaging in a notch 31 in the lower portion of the key shank 15. These springs 30, as shown in Figure 22, have normally straight intermediate portions which buckle when the corresponding key is depressed substantially half way down, giving a distinctive "feel" to the operator so that he may be sure that each is depressed a full stroke.

The extremities of the arms 17 in the alined series 25 are positioned above a plurality of series of selector stops 35, there being nine such stops in each of a plurality of rows, the number of rows being equal to the number of denominational orders which it is within the capacity of the machine to total. As shown there are eight such rows, and these selector stops are mounted vertically in a carriage 40 mounted for motion transverse of the machine. As shown best in Figures 3, 5, 13, 14 and 19, this carriage is supported for lateral sliding motion on a rod 41 which extends across the machine and on the lower forwardly turned extremity 42 of a laterally extending frame member 43 depending from the frame member 16. Each of the selector stops 35 is vertically movable in the carriage between either of two positions in each of which it may be yieldingly retained as by the engagement in one or the other of a pair of notches 45 in its side face of a V extremity of a looped leaf spring 46. As shown, for example, in Figure 21, one of these selector stops at the left hand end of the row has been depressed so that the spring 46 engages in the upper notch 45, while the remainder of the selector stops are shown in raised position with the corresponding leaf spring in the lower notch 45.

Beneath the carriage 40 and toward the right hand side of the machine there is positioned a cam plate 47 (Figure 21) having at its left edge a down-turned portion 48 so that when the carriage 40 is moved to its right hand position, any of the selector stops 35 which may have been depressed are cammed up to their upper positions and ride upon the top face of the plate 47. As the carriage is moved toward the left, the several rows of selector stops are brought sequentially beneath the series of extremities 25 of the selector keys so that whenever one of these selector keys is depressed, the corresponding selector stop in its series is also depressed. After each actuation of a number key to depress a selector stop the carriage 40 moves to present the next row of selector stops beneath the series of actuator extremities. The mechanism by which this is accomplished will now be explained.

Referring to Figures 5 and 23 to 25, it will be noted that the carriage 40 has fixed thereto one end of a flexible ribbon 50, the opposite end of which engages more or less about the periphery of a segment 51 which is fixed to a vertical pinion shaft 52 which has at its lower end a pinion 53. With this pinion meshes a rack bar 54 carried by a slide plate 55 which is normally pulled rearwardly as by a spring 56 secured at one end to the forward downturned extremity 57 of the slide plate 55, and at its other end to the extremity 570 of a lever 58 which extends across the machine and has a pivotal end portion 581 fulcrumed in an opening 59 in the left hand vertical partition 216. A roller 580 carried by the lever 58 and bearing against the inner face of the partition 217 retains the lever 58 in position. The slide plate 55 has a longitudinal slot 60 through which the shaft 52 passes and a parallel slot 61 through which a pivot pin 62 secured to the lever 58 extends.

The spring 56 tends to turn the segment in a direction to project the carriage to the left hand end of its linear path into the position shown in Figure 24 at which time the ribbon 50 is substantially wholly unwound from the segment 51. The carriage at its other limit of motion is shown in Figure 23 where approximately one-half of the length of the ribbon 50 is wound upon the periphery of the segment 51 against which it is held as by a roller 65 carried by a fixed frame member 66 and spaced sufficiently from the periphery of the segment 51 to permit the passage of the ribbon 50 between them. As a result of the described arrangement, the energy stored in the ribbon spring 50 is applied with a positive gradient as it is unwound, i. e., its force is increased as the carriage 40 is advanced to the left—while the energy stored in the coil or tension spring 56 is applied with a negative gradient—its force being decreased as the carriage is advanced to the left. The combination of the two springs, arranged as described, results in their stored energy being applied with a flat gradient, i. e., the carriage 40 advances by an equalized force to the left, the force at the beginning of the travel is thus the same as at the end of travel. Along its forward upper edge the carriage 40 is provided with a forwardly extended flange member 70 which is formed on its edge with a plurality of notches 71 between forwardly extending teeth 72, and means are provided cooperating with these teeth and notches for permitting the carriage to be moved by the action of the spring 56 from the position shown in Figure 23 toward that shown in Figure 24 by a series of steps, each sufficient to remove one row of selector stops out from beneath the extremities 25 of the selector keys and to bring the next row of selector stops into the same position, and this action takes place each time a number key is depressed between actions of the totalizer mechanism. The mechanism for accomplishing this is shown best in Figures 19 and 20.

Referring to these figures, pivoted to a lug 75 on the left hand partition 216 is one end of a dog 77 having a downwardly extended hook portion 78 at its opposite end. This dog 77 intermediate to its ends is turned to the rear, or upwardly as shown in Figure 20, and overlies a second dog 79 which is pivoted to the dog 77 at 80. This dog 79 has at its inner end an upturned hook member 81. When the equalizer plate 18 is depressed by depression of any of the number keys, the plate contacts and depresses the dog 77. The dog 77 and the dog 79, are thus both depressed, the hook portion 81 is depressed from one of the notches 71, while the hook portion 78 comes down in front of one of the teeth 72. Thus the carriage is released for a one-half step motion toward the left as the hook 81 is depressed and the carriage steps over until one of the teeth 72 contacts with the hook 78. On subsequent lifting of the equalizer plate 18, the dog 77 is lifted by the action of a leaf spring 85 which bears on its under face and is threaded through a pair of holes 86 and 87 in the partition 216. The hook 81 then comes into the next notch 71 permitting a second one-half step of the carriage and further lifting of the dog 79 lifts the fulcrum 80 until a roll 88 thereon is stopped by engagement with a positive stop member 89. The hook 78 is then out of contact with the carriage and so remains until it is depressed by a subsequent depression of any one of the number keys. With this arrangement, each time the operator depresses a number key the carriage moves over by one step, the number of steps corresponding to the number of digits in the number which is to be added or subtracted, at each actuation of a number key there being a correspondingly positioned selector stop in the corresponding row of selector stops depressed. For example, as shown in Figures 13 and 14, the No. 4 stop is depressed in the particular row in position where the carriage was when the number key was depressed. At each actuation of the totalizing mechanism the carriage is moved back to its extreme right hand or starting position by means which will later appear.

Means are also provided by which the carriage is prevented from being moved to its initial position accidentally as by the machine being dropped on its edge or otherwise receiving rough handling. This means comprises a third dog 95, shown best in Figures 19 and 28, this dog having a downwardly projecting point 96 adapted to project into one of the notches 71 at the right hand face of a tooth 72. This dog 95, as best shown in Figure 28, comprises an angle member, one arm 97 of which is provided with an upstanding lug 98 fulcrumed on a shaft 99 mounted at its ends in a bearing lug 100, and in a flange 101 upstanding from the cross frame member 16. Also rockable on the shaft 99 is a U-shaped portion 102 of an arm 103 which has an upstanding and forwardly turned end portion 104 against which one of the side arms 105 of the machine operating bar engages when this bar is in its neutral position. A spring 106 has one end engaging the upper edge of the dog 95, its intermediate portion is wound around the shaft 99, and its opposite end portion is fixed to the side of a lug 107 upstanding from one arm of the U-shaped member 102. The spring 106, when the arm 103 is in the position shown in Figure 28, is tensioned to hold the dog 95 in its downward locking position back of one of the teeth 72. It may be seen in Figure 28 that an extension (shown in dotted lines) of the member 102 extends beneath and engages the under surface of the arm 97 which is integral with the dog 95. A spring 108 is fixed at one end to the pin 109, supported on the plate 16, and at its other end is secured to the U-shaped portion 102 at 110. As the member 102 is rocked by the spring 108 upon movement of the handle bar 105 away from the member 103, the downward pressure of the spring 106 on the dog 95 is released and at the same time the extension of the member 102 acts on the bottom surface of the arm 97 and lifts the dog 95 out of position to obstruct the return motion of the carriage.

*Totalizer*

As shown, the totalizer comprises a series of digit wheels 120 journaled on a shaft 121 which extends across the machine. Each of these wheels 120, carries two complete sets of digits from 0 to 9 on its periphery, one digit at a time of the several wheels being visible through a window 125 in the top of the casing. As shown, each of the wheels comprises a pair of disks 126 and 127 secured to the hub portions 128 and 129 of a pinion 130. These disks 126 and 127 are provided with annular stiffening ribs 131 and disk 126 has a rim portion 132 which carries the digit indications. At diametrically opposite points, the disk 127 has outwardly projecting ears 135 and one or the other of these ears is in position to act on other mechanism when the disk is being turned between positions where a "0" and a "9" thereon are moving beneath the window. These disks are in number equal to the number of denominational orders which it is within the capacity of the machine to register, nine such orders being shown, although more or less might be employed as desired.

Except when a wheel is to be turned, it is held locked against turning, and locking means for each wheel consists of a finger 140 carried by a U-shaped member 141 which extends across the series of totalizer wheels, the end walls of which are slotted to slidably engage guides 142 coaxial with the totalizer shaft 121. The fingers 140 are provided with teeth 143 adapted to engage between the teeth of the corresponding pinion 130. The U-shaped member 141 is supported by a hanger 144 carried by a shaft 145. By rocking this shaft from the position shown in Figure 13 to that shown in Figure 14, the fingers 140 may be retracted from their respective pinions, thus unlocking the totalizer wheels for turning motion.

*Totalizer actuating mechanism*

The totalizer mechanism is actuated by the rocking of a handle bar 150 which extends across the machine toward its front end and is carried at opposite ends by a pair of arms 105. These arms extend through slots 155 in the top wall of the casing, and toward their lower ends these arms 105 are fulcrumed on a transversely extending shaft 156. Beneath the top frame member the arms 105 are cross-connected by a transverse member 157 which may be integral with these arms. The lower ends of the arms 105 beneath the fulcrum shaft 156 are pivoted as at 158 to the rear ends of a pair of links 159 to which are attached the rear extremities of a pair of rods 160 which extend slidably through end flanges 161 and 162 of U-shaped links 163 withdrawal from which is prevented by suitable means such as lock nuts. A spring 164 surrounds each of the rods 160 and bears at its forward end against an in-turned end flange 165 of the link 159 and at its other end against the flange 161. This provides a yielding connection between the lower ends of the arms 105 and the members 163. The members 163, in turn, are connected by pivot and slot connections at 167 to the intermediate portions of a pair of arms 170, pivoted at their upper ends on trunnions 171 and pivotally connected at their lower ends as at 172 to a pair of links 173, the forward ends of which are, in turn, pivoted at 174 to side members 175 (see particularly Figure 27) of an under-carriage. These side members 175 are supported at their rear ends on a transverse rod 176 which passes through slots 177 therethrough. These side members 175 are connected together as by a transverse plate 178 which may be integral therewith and which has a forward central extension 179 which may be provided along one edge with a rack portion 180. This rack portion 180, as shown best in Figures 23 and 24, may mesh with a pinion 181 on a shaft 182 which also carries a wheel 183 having a serrated periphery and is held in such mesh by an idler 183a with which the opposite edge of the extension 179 engages. This wheel 183 is a portion of a damping mechanism, which may be employed, if desired, to limit the speed of actuation of the parts and thus avoid undesirable inertia forces. Cooperating with the serrations on the periphery of the wheel 183 are a pair of pins 184, 188 carried by an oscillator bar 185 fulcrumed at 186. This oscillator bar may be of some weight. Turning of the wheel 183 causes its serrations to engage with the pins 184, 188, imparting a rapid oscillation to the bar 185 which produces the desired speed limiting action due to inertia of the bar 185. It also imparts a vibration which acts on the various portions of the machine to avoid sticking of the parts under friction of rest, resulting in a sensitivity of action which causes prompt response of the various mechanisms to actuating pressure. The wheel 183 and the bar 185 are preferably of material such as hard fibre or resin composition to avoid noisy operation. The forward end of the member 179 is narrowed, and provided in its narrow portion with a pair of upstanding flanges 190 and 191. Adjacent to its widened rear portion it has upstanding therefrom a roller 195 journaled on a post 196. The lever 58 hereinbefore mentioned in connection with the carriage mechanism bears against the forward edge of the cam roll 195 as shown best in Figure 23 for a purpose which will later appear.

The side members 175 of the under-carriage are provided with a pair of opposed longitudinal slots 200 within which is slidably mounted the end portions of a spring bar 201 and arranged along this spring bar and perpendicular thereto are a series of totalizer pilot bars 202, there being one of these pilot bars for each totalizing wheel, Figure 27 showing but one of these bars in position. They are all alike, however, so that a description of the mounting of the one shown in Figure 27 will suffice for all. Each is provided with a longitudinal slot 203 through which the spring bar 201 passes, this slot 203 being of increased width toward its rear end, as at 204, where it is slidably guided on the cross rod 176 shown in Figures 8 to 16, inclusive. The under side of its forward portion is cut away as at 205 and houses therein a coil spring 206, the forward end of which is engaged with the bar 202 through a hole 207 therethrough, and the rear end of which is engaged in a hole 208 through the spring bar 201. Each of the bars 202 is therefore connected to the spring bar 201 yieldingly and the spring bar is connected through a lost motion of the slots 200 with the under-carriage. The forward end of each bar 202 is provided with a longitudinal slot 210 within which rides the pivot shaft 156, opposite ends of each bar 202 thus being supported for longitudinal sliding motion on the pivot shaft 156 and the transverse bar 176.

With this construction it will be noted that when the handle bar 150 is swung forwardly and downwardly, as permitted by arcuate slots 215 in a pair of inner longitudinal partition members 216 and 217, through which the connecting member 157 of the arms 105 passes, the bars 159 are moved rearwardly and through the springs 164 and the members 163, the levers 170 and the links 173, the under-carriage is given a rearward motion. The speed of carriage motion is regulated by the speed of rotation of the notched wheel 183, which, however, does not interfere with the rate of motion of the handle bar 150, any difference in speed being taken up in compression of the springs 164.

Through the springs 206, a pressure tending to move each of the bars 202 rearwardly is also produced, but some of these bars, depending upon the lateral position of the selector stop carriage, may not be able to partake of such motion. This is for the reason that they may be held back by hooks 220 (Figures 3, 13 and 14), one for each of the bars 202 being fulcrumed on a shaft 221 held in supporting lugs 222 and 223 on the inner faces of the partitions 216 and 217, as shown best in Figure 4. The rear ends of the hooks 220 may be held in inoperative positions by a forwardly directed flange 224 on the lower forward edge of the selector stop carriage as is shown in Figure 14. This flange 224 holds those hooks inoperative which are associated with the pilot bars of the denominational orders which were employed in setting up a particular number in the machine. All the other hooks, at the time of actuation of the handle bar 150, will be depressed at the time of such actuation, bringing a shoulder 225 on each beyond a stop flange 226 on the corresponding pilot bar 202, thus preventing the backward motion of the corresponding bar 202 when the handle 150 is pulled downwardly and forwardly.

Those bars 202 which are not so locked will be pulled rearwardly by the rearward motion of the under-carriage until a second stop element 227 thereon engages against that particular selector stop of the selector stop carriage which was depressed by the depression of the corresponding number key. For example, as shown in Figures 13 and 14, the selector stop corresponding to the four-digit key is depressed, so that the corresponding stop lug 227 of the corresponding pilot bar 202 will move rearwardly into contact and be stopped thereby. It will be noted that on the rear edge of the selector stop carriage there is a downwardly depending flange 230 which provides a stop corresponding to the depression of the 9-digit key. This is the extreme limit of motion of any of the bars 202 so that it is not necessary to provide a movable selector stop for this digit key. Consequently this digit key, as shown best in Figure 20, extended only into contact with one of the equalizer plates 18 as at 17a.

Means are provided by which the hooks 220 are lifted above the flange 224 when the handle bar 150 is in its rearward normal rest position, so that they will not interfere with the lateral motion of the selector stop carriage. This lifting is done by the following means. On the inside face of each of the partitions 216 and 217 are pivoted a pair of dogs 235, as on the pivots 236. Each of these dogs has a shoulder 237 which is contacted by the crossbar 157 of the handle mechanism when this handle mechanism is in its rearward upright position, shown for example, in Figure 13. Bridging across from one to the other of these dogs 235 is a somewhat channel-shaped member 238 which has a curved marginal flange 239 which rides upon a cam surface 240 on a tail portion 241 of each of the hooks 220. This cam surface 240 is held into contact with the portion 239 as by a spring 243 for each of the hooks 220, this spring being connected at one end to the hook as at 244 and at its other end to the opposite edge flange 242 of the member 238. The cam surface 240 is so shaped that when the handle bar 150 is in its normal position and the portion 239 engages the upper portion of the cam face 240, the tail portions 241 are pressed forwardly and downwardly, lifting the rearward ends of the hooks into the position shown in Figures 3 and 13. When the handle bar member is moved downwardly, the dogs 235 tilt as shown in Figure 14, allowing those hooks which are not positioned above the carriage flange 224 to drop down until their shoulders 225 engage rearwardly of the lugs 226 of the corresponding actuator bars 202. Only those pilot bars 202 which are free of the hooks 220 riding on the carriage flange 235 are then permitted a backward movement in response to the downward swing of the handle 150, and those pilot bars 202 which are permitted such a motion are permitted this motion only to the extent determined by the particular selector stop which was depressed by the action of a number key, or in case the No. 9 key was depressed by the carriage flange 230. The motion of the pilot bars may thus be caused to actuate the corresponding totalizing wheels selectively to rotate these wheels in adding or subtracting direction, or to bring all the wheels to "0" position to clear the machine for the commencement of the adding operation.

Each of the bars 202 is arranged to actuate, under suitable controlled conditions, a totalizer bar 250 which is mounted directly beside its pilot bar 202. It is mounted for sliding motion on the shaft 221 which passes through a guide slot 251 through the forward end portion of the bar 250 and its rear end, has a similar slot 252 through which extends a second guide bar 253. This guide bar 253, however, is movable up and down within vertical guide slots 2531 in the wall members 216 and 217, so as to present either an upper downwardly facing rack bar portion 255, or a lower upwardly facing rack bar portion 256 at its rear end into engagement with the corresponding pinion 130 of a totalizer wheel, or to be in an intermediate position where both of these rack bars are out of engagement with the pinion. The upper rack bar is shown in engagement with the pinion in Figure 9 and the lower rack bar is shown in such engagement in Figures 8, 14 and 15, while the rack bar is shown in the intermediate position with neither rack bar in engagement with the pinion in Figures 13 and 16. It will thus be noted that the rack bars are spaced a distance slightly greater than the maximum diameter of the pinion.

In order to adjust the guide bar 253 between its three positions of elevation, its opposite ends are carried by a pair of cams 260, one of which is shown best in Figure 7. Each cam 260 is supported between a pair of fixed abutment pins 261, 262 diametrically oppositely disposed to the guide bar 253 and supported by the frame members 216 and 217. Each of the cams 260 has an external cam face including a high arcuate portion 265 and a low arcuate portion 266 which are arranged diametrically opposite to each other. Between these high and low arcuate portions are portions 267 of intermediate height. The pins 261, 262 are in line with the slots 2531 and are so spaced apart that when one engages the high arcuate portion of the cam, the other engages the low arcuate portion and the guide bar 253 is held in either its upper or lower extreme positions.

Means are provided by which the cams 260 are rocked angularly about the axis of the guide bar 253, this rocking motion causing the guide bar 253 to be moved vertically in its guide slots so as to take either its extreme upper position, its extreme lower position, or an intermediate position. In the upper position the lower rack bars are moved up into engagement with their mating pinions. In the intermediate position both rack bars are out of engagement with their pinions, and in the lower position the upper rack bars are in engagement with the pinions.

The means by which the cams are rocked to take these various positions comprise a trace 270, shown detached in Figure 7 and positioned to the right of the partition 217. Its rearward end portion is pivoted as on a pivot pin 310 which passes through a hole 272 in the trace, and it also has a longitudinal slot 273 therein through which passes a pin 274 projecting from the lower end of an L-shaped member 275 which is fulcrumed at its perforation 276 on the pivot pin 2710 which is supported on the partition or frame member 217 (see Figure 5). The pivot pin 310 is supported on a hanger 301 which is described further hereinafter. At the upper end of the L-shaped member there is attached one end of a coil spring 277, the opposite end of which is attached to a fixed pivot post 278. This spring tends to hold the upper portion of the L-shaped member 275 rocked against a stop lug 279 projecting from the forward edge of a lever 280, the lower end of which is also pivoted on the pivot 2710 on frame 217. This lever 280 projects upwardly through a slot 289 in the top of the casing and has an actuating knob 290 at its upper end. The slot 289 is normally covered by a sliding plate 291 which moves with the lever 280. The lever 280 has three positions, its forward position shown in Figure 10 in which the stop lug 279 is out of contact with the forward edge of the L-shaped member 275, an intermediate position shown in Figures 3 and 7 where the L-shaped member 275 is in contact with the stop lug 279, and a third rearward position where the stop lug 279 is still in contact with the member 275 but in which the member 275 is rocked rearwardly with its pin 274 in its upper position, rocking the trace upwardly into the position shown in Figure 9. The L-shaped member 275 has but two angular positions, in one of which the forward end of the trace 270 is lifted as shown in Figure 9; the other in which the forward end of the trace is lowered as shown in Figures 3, 8, and 10.

*Addition*

When the knob 290 is in its intermediate position, the parts are positioned to cause operation of the machine to add, and in this position of the parts, the L-shaped member 275 is so disposed as to lower the forward end of the trace. The operator presses the number keys corresponding to the number of digits in the number which is to be added, starting from the left hand digit, and when this has been completed, he rocks the handle bar 150 downwardly and then allows it to return to its former upright position. The rocking of the handle bar 150 downwardly through the means previously described causes the under-carriage to move rearwardly. After a small lost motion of the under-carriage until it contacts the spring bar 201, the spring bar moves rearwardly with the carriage, and through the springs 206 moves all of the pilot bars which have been held unlocked by the selector stop carriage flange 224 holding the locking hooks elevated, as far as permitted by the particular selector stops which have been depressed in accordance with the particular number keys which have been depressed. This backward motion of each of the pilot bars 202 which have been released, acts through a pin 295 on the corresponding totalizer bar 250 which contacts a shoulder 2990 thereon (Figure 14) to move the totalizer bar rearwardly. At this time the guide bar 253 is in its intermediate position so that the totalizer bars move rearwardly out of contact with the pinions of the totalizer wheels. It will be noted that the under-carriage moves through its complete length of stroke at each full actuation of the handle bar 150, but the length of stroke of each of the pilot bars 202 and its totalizer bar 250 is dependent upon the particular selective stop which is contacted by the lug on the bar 202, thus limiting the lengths of stroke of the rack bars to distances corresponding to the particular number of the number key which controls it. The backward motion of the under-carriage continues until the forward end of the slot 177 engages the cross bar 176, whereupon this cross bar 176 is carried with it for the remainder of its stroke. This cross bar 176 at its right hand end engages in a perforation 300 in a hanger 301, shown detached in Figure 7, and which is provided with spaced slots 302 and 303 adjacent to its ends through which pass fixed pins 304 and 305 projecting outwardly from the side wall 217 so that this hanger is permitted a limited horizontal motion. It carries an inwardly projecting pivot pin 310 which engages in the pivot opening 272 of the trace 270 so that this trace is given a rearward motion during the last portion of the rearward motion of the under-carriage. The forward end of the trace is provided with a pair of oppositely disposed arcuate slots 311 and 312 within which are adapted to ride spaced pins 313 and 314, respectively, projecting outwardly from the right hand cam 260.

When the trace is in its lowered position, as in the adding position assumed, the pin 314 is in the slot 312 and as the trace is pulled rearwardly the cam 260 is rocked from the position shown in Figure 3 to the position shown in Figure 8. This rocks the cams 260 counterclockwise, causing the cams, which ride between the fixed elements 261 and 262, and the bar 253 to be lifted. This lifts the rear ends of the totalizer bars, bringing the lower rack bars of each into mesh with the totalizer gears in the position shown in Figure 8. It will be noted, however, that all the rack bars which have been moved are then in backward positions which have been determined by the particular number keys previously depressed for controlling their associated totalizer bars, so that the distances forwardly from the rear ends of the rack bars where they engage their pinions is dependent upon the particular number key which controls each. The rearward motion of the hanger 301, through a pivoted link connection 320 (Figure 3) with the totalizer locking shaft 145, causes the rocking of this shaft in a direction to withdraw all of the locking fingers 140 from locking engagement with the totalizer wheels, thus freeing them for rotation. Releasing of the handle bar 150 allows a pair of springs 325 attached at their rear ends to the forwards ends of the under-carriage side bars 175, as through the perforations 326 and attached at their forward ends to fixed points 327 of the machine frame, to retract the under-carriage and restore links 159 forwardly and handle bar 150 rearwardly to their normal positions. The spring bar 201 being pulled back by the under-carriage, engages the forward ends of the slots 203 in each of the pilot bars which have been moved rearwardly to any extent and retracts them all to starting position. Through the springs 296 which engage the pins 329 on the pilot bars and pins 295 on the totalizer bars, the rack bars which were moved rearwardly when the handle 150 was depressed are pulled back to their starting positions, turning the corresponding totalizer pinions, and totalizer wheels, by amounts corresponding to the controlling number keys which were initially depressed. The return motion of the under-carriage also causes a similar return motion of the hanger 301, together with the corresponding motion of the trace, which acts upon the lower pin 314 to rock the cams clockwise to their starting position and lower the cross bar 253 to starting position. The return of the hangers also returns the locking fingers 140 to locking positions, retaining the totalizer wheels in the positions to which they have been moved by the action of the rack bars. This return motion of the handle 150 also acts to return the stop selector carriage to its right hand limit of motion and to return the selector stops previously depressed to initial position. The return of the carriage will be described later.

Totalizer carry-over

It will be evident that whenever a totalizer wheel is turned to pass from the "9" indication opposite the sight window to a "0," it is necessary to turn the next adjacent totalizer wheel to the left by one numeral. Means for effecting this will now be described.

As previously noted, each of the totalizer wheels has a pair of outwardly projected diametrically opposed ears 135. As the number indication visible on a wheel is passing between the "9" and "0," one of these ears 135 engages and passes across a follower projection 330 on a trigger arm 331 pivoted on a cross shaft 332 (see Figures 13 to 16, inclusive). Each arm 331 has an upwardly extending notch 333 therein which engages over a pin 334 on a hook lever 335 fulcrumed on the bar 253. The hooked extremity 336 of this hook is adapted to engage forwardly of a lug 337 projecting from the side face of the next totalizer bar 250 to the left of the totalizer wheel whose ear 135 contacts the cam follower lug 330, such engagement normally defining the forward limit of motion for each totalizer bar, there being one such hook for each totalizer bar. The engagement of the ear 135 on this cam follower projection swings the corresponding arm 331 from the full line position shown in Figures 13 and 14 to the position shown in Figures 15 and 16 which releases the hook 336 from the lug 337 and permits the spring 295 to pull the totalizer bar forwardly until its pin 295 strikes the shoulder 299a of its pilot bar which is just sufficient to turn the corresponding totalizer wheel by one digit indication. The lower end portion of each arm 331 is provided with a latch pin 340 which rides on the upper face of a leaf spring 341 having a central hump 342. This spring acts as a latch to yieldingly retain the arm 331 in either of the angular positions into which it may be put, both being shown in full and dotted line in Figure 16. The lower end of each arm 331 also projects downwardly as at 342a into the path of motion of a finger 343 carried by the spring bar 201.

On the next downward motion of the handle bar 150 the rearward motion of the pilot bar immediately starts the rearward motion of the released totalizer bar without the starting lost motion present when the forward motion of the totalizer bar was stopped in normal position by its hook 336. The arm 330 is also returned to its former position lifting the hook 336 into operative position when the finger 343 of the spring bar engages and moves the lower end of the arm 330 rearwardly.

Totalizer carry-over modification

A totalizer carry-over mechanism of modified construction is illustrated in Figures 30 to 33, inclusive. In this modification the trigger arm 331a is substituted for the trigger arm 331 shown in Figures 13 to 16, inclusive. The trigger arm 331a is fulcrumed on the shaft 332 and is provided with an edge 451 which normally engages against a laterally extending lug 452 on a pawl 453 pivoted at 454 to a carrier 450. This carrier 450 is supported on the vertically movable bar 253 and has a slot 455 in its upper edge slidably guided on the shaft 332. The normal position of the parts is shown in Figure 30. The pawl 453 is normally held by a spring 456 attached at opposite ends in a hole 457 in the carrier 450 and a hole 458 in the pawl in angular position to cause the edge 451 of the trigger lever to engage the lug 452 of the pawl and hold the pawl with its latch edge 460 in position for the edge 461 of the next totalizer bar 250a to the left of the controlling lever 331a to impinge thereon when the totalizer bars are returned forwardly. The totalizer bar 250a is not provided with any lug 337 since this is not needed with the construction herein shown. Whenever the lug 330a of the trigger lever 331a is struck by an ear 135 of its totalizer wheel, throwing the trigger lever 331a to its forward position as shown in Figure 31, the portion 451 of the trigger lever rocks upwardly and tilts the pawl 453 counterclockwise, removing its edge 460 from obstructing position for the edge 461 of the totalizer bar next to the left, thus permitting this bar to retract by one further totalizing wheel indication, and effecting the desired carry-over. Backward motion of the under carriage in the next operation of the machine returns these parts to normal positions, as described in connection with Figures 13 to 16, inclusive. This modified mechanism has the advantage over the mechanism shown in Figures 13 to 16, inclusive, in that it is positioned where it is more accessible for inspection and repair when the cover of the machine is removed.

Subtraction

When it is desired to subtract it is first necessary to position the totalizer wheels in accordance with the original number or minuend, and to this end the keys are operated starting from the left hand digit of this number. The handle 150 is then depressed and allowed to lift again, thus showing the desired minuend beneath the window. The knob 290 is then moved to its rearmost position as shown in Figure 9, and the subtrahend number is then introduced by pressing the corresponding number keys, also starting from the left hand digit. The handle bar 150 is then depressed and allowed to rise as before.

During the first portion of the depression of the handle 150, the under-carriage is moved rearwardly as previously described. Prior to this, the forward end of the trace is placed in the lifted position shown in Figure 9, so that the upper cam lug 313 is within the upper trace slot 311. Completion of the handle depression, which also moves the hangar 301, then causes the trace to turn the cam 260 in clockwise direction and lower the shaft 253. This lowers all of the totalizer bars so that their upper rack portions 255 engage the totalizer pinions. Thus upon lifting the handle 150 these rack bars which were allowed to move rearwardly to extents controlled by the particular stop lugs depressed by the actuated number keys rotate the corresponding totalizer wheels in directions to effect a subtracting action. Where any of these wheels moves between a "0" and "9" indication, the carry-over operates as in effecting addition, except in the reverse direction because the reverse direction rack is in operative relation to the pinions.

Clearing

It is, of course, necessary to bring all the totalizer wheels to "0" before starting an addition operation. Means are provided by which this may be done by actuation of the handle bar 150. For this purpose the knob 290 is moved forwardly to its extreme position in Figure 10. In this position of the parts the L-shaped member 275 is in its forwardly tilted position so that the trace 270 is lowered into the same position in which it was placed for adding, with the lower cam lug 314 engaged in the lower trace notch 312. The lever 280 is pivotally connected through a link 350 to a plate 351 which is pivoted at 352 to the right partition wall 217. As shown best in Figure 13, dotted lines, this plate 351 has an elongated notch 353 in its upper edge presenting an inclined cam surface 354 at one end of the notch and a shoulder 355 at its opposite end. Beyond the shoulder 355 is a cam face 357. Riding on the cam faces 354 and 357 are follower rolls 358 and 359, respectively, on a pair of scissor elements 360 and 361, respectively (see Figure 10). These scissor elements 360 and 361 each have slots in their upper ends as at 362, each of which embraces a fixed pivot 363 projecting from the wall 217. These scissor elements are thus permitted an up and down motion at the slots 362, fulcruming about the centers of the cam follower rolls 358 and 359 and they also have pivotal motion about the fixed pivot 363. The pivot pin 352, located between adjacent edges of the scissor elements 360 and 361 which are notched to receive it, acts to limit the swinging motion of each scissors element toward the other. These scissor elements are movable in overlying planes and at their lower ends they are provided with oppositely directed flanges 365 and 366 which project over into a common plane and in the same plane with a lug 367 upstanding from an arm 368 pivoted at 369 to the hanger 301. This arm 368 has a cam follower roll 370 in position to be contacted by an inclined cam face 371 at the rearward end of the right hand side member 175 of the under-carriage. This same side member has an oppositely sloped cam face 372 spaced forwardly of the cam face 371. When the knob 290 is in the "clear" position, the plate 351 is rocked to the position shown in Figure 10, the cam follower 358 then riding at the base of the elongated notch 353, while the cam follower roll 359 rides on the cam face 357. In this position of the parts, the lower end of the scissors member 360 is immediately above the lug 367 and prevents lifting the rear end of the arm 368 by engagement of the follower roll 370 on the cam face 371, beyond the limited motion required to bring the bottom of the scissors slot against the pivot 363 as shown in Figure 11. It is, however, lifted sufficiently to come above the lower end of the other scissors member 361. Continued rearward motion of the under-carriage, since the arm 368 cannot lift, causes this arm, together with the hanger 301 to which it is attached, to move rearwardly with it and it also causes the other scissors member 361 to swing to the dotted line position shown in Figure 11. The movement of the hanger 301 rearwardly causes the trace to be moved in the same manner that it did during adding and thus rocks the cams 260 counterclockwise and raises all the totalizer bars 250 to bring their lower rack bars into engagement with the totalizer gears and it also retracts the totalizer wheel locks 140, but this after only a short rearward travel of the under-carriage. The adjustment of the knob 290 to "clear" position also moves forwardly a slide plate 372 (Figures 3 and 29) having a notch 373 engaging a pin 3730 on the arm 280, so that a forward edge portion 374 thereof extends above a shoulder 245 on the dog 235. This prevents the turning of this dog and holds the hooks 220 elevated so that all the pilot bars are free to be moved rearwardly with the under-carriage. Continued rearward travel of the carriage thereafter thus rotates all of the pinions until each is stopped by engagement of one or the other of its totalizer wheel ears 135 with a stop 375 (see Figures 5 and 13). This stop 375 is pivoted at 376 to the frame member 217 and is provided with a downwardly extended slotted arm 377 which embraces a pin 378 projecting from the inner face of the plate 351 and which may form the pivotal connection to the link 350. When this plate 351 was initially rocked by the positioning of the knob 290 in "clear" position, the stop 375 was brought down into the dotted line position shown in Figure 13 where it is in position to be engaged by the totalizer wheel ears 135. The under-carriage may continue its full stroke rearwardly while the bars 250 are stopped by the positive stopping of their respective totalizer wheels in any position in which they may happen to be, further motion of the under-carriage merely extending the springs 206 which act independently for each of the pilot bars. When the lower ends of the scissors elements are sufficiently separated to permit the lug 367 to move upwardly between them, the side member 175 is then freed for motion independently of the continued rearward motion of the hanger so that it can complete its rearward stroke to the point where the cam follower 370 drops back of the cam face 372 of the side member 175 into the position shown in Figure 12. At the extreme rearward position of the under-carriage on the return motion of the handle 150, the totalizer bars are immediately brought out of mesh with the totalizer pinions, since the clearing action of the wheels has then been completed. The lowering of the lug 367 as the cam follower roll 370 rolls down the cam faces 372 permits the scissors member 361 to return to its former position close to the scissors member 360 and with its lower end immediately above the lug 367. Thereafter as the under-carriage is pulled forwardly by lifting the handle 150, since the lug 367 is now prevented from lifting beyond the lost motion permitted at the pivot 363, the hanger 301 is immediately connected for retraction with the under-carriage which presses forwardly on the trace 270 and rocks the cams 260 in clockwise direction, returning them to the original position. Thus the return motion of the totalizer bars is out of operative contact with the totalizer pinions.

Means are provided for releasably locking the handle 290 in either its "clear" or "subtract" positions. As shown on Figures 3 and 10, this means comprises a pair of arms 380 and 381 connected to the cam pivot shaft 278. The arm 380 extends back of the arm 280 and is provided with a pair of spaced shoulders 382 and 383, between which is a concave face 384. A lug 385 on the arm 280 is adapted to be engaged with either of the shoulders 383 or 382, or with the face 384. When the arm 280 is in its forward position at "clear" as shown in Figure 10, the lug 385 is in engagement with the shoulder 383. The arm 381 has pivoted thereto adjacent to its rearward end, a dog 390 having a curved cam face 391 which may be engaged by a bevel face 392 on the hanger 301 when the hanger is moved thereto ward as in Figure 12. In this position of the parts, a lug 393 on the dog engages a stop 394 on the arm 381, and the dog 390 is ordinarily held in this angular position as by a leaf spring 395. Since the dog cannot rock clockwise from the position shown in Figure 12, when the inclined face 392 of the hanger strikes it, the arm 381 is rocked upwardly, rocking the arm 380 and lifting it from engagement with the lug 385. This releases the arm 280 from "clear" position and the spring 351a, working through the plate 351 and the link 350, returns the arm 280 to its normal "add" position. When the arm 280 is in "subtract" position, the shoulder 382 engages the lug 385 and here, again, as the hanger is retracted, the arm 380 is lifted, releasing the lock. When the hanger 301 is moved in the reverse direction, as from the position shown in Figure 11 to that shown in Figure 12, the dog 390 may yield and permit it to pass without lifting the locking arm 380. This locking arm can be released at any time, however, by the operator, by merely depressing a pin 397 which extends through the casing, and the lower end of which bears on a rearward extension 398 of the arm 381.

When the arm 280 is in its intermediate "add" position or in "substracting" position, the plate 351 is in such angular relation that the scissors members have their cam followers 358 and 359 riding on their high points of the plate 351 which holds their lower ends separated in the positions shown in Figure 3 so that they offer no obstruction to the lifting of the lug 367, so that the hanger is not coupled to move with the under-carriage until toward the end of the under-carriage backward stroke when it is picked up by the rod 176, as previously explained.

The selective stop carriage return mechanism

As before noted, at the end of a number-selecting operation, at which time the selector stop carriage 40 has been moved at least part way toward the left side of the machine, the upward motion of the handle 150 normally returns the carriage to its starting position at the extreme right hand end of its travel. Such action occurs at the end of the normal adding or subtracting operations, but certain variations of this are possible. The return mechanism comprises a stop lever 400 (Figures 23 and 24) which is pivoted at 401 to the arm 58 between its ends and overlies the forward extension of the under-carriage member 179. This stop lever 400 is provided with a forwardly extending actuating and controlling arm 402 on either side of which may be engaged downwardly extending forks 403 of a controlling slide 404. This slide is movable along a guide post 405 and may be yieldingly latched in any one of three axial positions as by a spring pressed ball latch 406 which engages in any selected of three peripheral grooves 407, 408 and 409 of the post 405. An actuating piece 410 which extends through a slot 411 in the forward wall of the casing engages with the slide 404 and may be employed to move the slide to any selected of its three axial positions. The forward end of the lever 400 has an end shoulder 412 which extends well forwardly, a second shoulder 413 at a much shorter distance from the fulcrum 401 and between them is positioned a slot 414. When the stop lever is in its mid-position shown in Figure 23, the flange 190 of the under-carriage as it is moved backwardly finally contacts with the shoulder 413 and rocks the right hand end of the lever 58 rearwardly to an amount sufficient to permit a latch 420 pivotally carried by the guide pin 62 to be swung outwardly under the action of a torsion spring 421 from the position shown in Figure 23 to that shown in Figure 24 in which the end portion 421 of the latch engages a lug 422 on the sliding plate 55. On subsequent lifting of the operating handle 150, which retracts the under-carriage, the cam roll 195 on the under-carriage engaging the lever 58, pushes the slide 55 forwardly, turning the segment 51 clockwise and winding the ribbon 50 thereon, thus to return the carriage to its starting position shown in Figure 23. Just as it reaches this position, a fixed abutment 425 is engaged by a lug 426 projecting from the latch 420 so that the latch is rocked out of engagement with the lug 422, thus releasing the carriage for lateral motion toward the left when this is caused by depression of one more of the number keys. Should the operator discover that he has made an error in depressing any of the number keys, he may wish to return the selector stops to neutral raised positions without imparting any motion to the totalizer wheels. When this is desired, the actuator 410 is moved to its left hand or "error" position, bringing the shoulder 412 in line with the lug 191 of the under-carriage. On them actuating the handle bar 150 to a small extent, the lever 58 starts its forward rocking motion very early and the lever 58 reaches its limit corresponding to Figure 24 before the handle 150 has been moved sufficiently to displace the totalizer actuator bars. The operator then returns the handle bar 150 to its upright position, whereupon the return of the under-carriage to its starting position returns the stop selector carriage to its starting position and all of the selector stops which are then depressed are lifted by the lifter plate 47.

In some cases it may be desired to repeat the same sequence of digits for successive totalizing operations. In such a case it will not be desired to return the carriage between successive totalizer actions, but to produce these totalizer actions without disturbing the previous setting of the selector stops or the carriage position. When this is desired, the control member 410 is moved to its right hand or "repeat" position, in which the lever 400 is swung to the right to the extreme dotted line position shown in Figure 24. In this position, backward motion of the under-carriage by depression of the handle 150 causes the lever lug 190 to ride into the slot 414 of the lever 400. This causes the motion of the handle 150 to fail to move this lever 400 so that the lever 58 is not moved to the position of Figure 24. Thus when the operating handle 150 is actuated, the carriage remains in its former position and repeated actuations of the hand lever 150 will cause repeated additions or subtractions of the same number for which the selective stops have been set, depending on whether adding or subtracting is being done, determined by the setting of the control knob 290.

Means are provided by which a complete stroke of the operating handle 150 is insured for each adding, subtracting, or clearing operation, a short stroke being permitted only where an error has been committed and it is desired to erase a number introduced into the machine through the selector stops and before an addition or subtraction has been made. This means is illustrated in Figure 6. The lower end of the arm 170 may be provided with a pivoted dog 430 normally held in the angular position shown in full lines in Figure 6 as by a spring 431. This dog is adapted to be moved over the upper edge of a plate 432 which is provided with a plurality of serrations 433 at its intermediate portion and with unserrated arcuate end portions 434 and 435. The arm 170 may be swung from its forward position shown, rearwardly until the dog 430 approaches the first apex 436 of the serrations and returned freely. The extent of this permissible motion is sufficient to provide for return of the stop selector carriage erasing error in the depression of the number keys, but is insufficient to cause any motion of the totalizer bars which effects movement of the totalizer wheels. However, after the arm 170 has been swung beyond the first apex 436, the dog 430 will be swung into position to obstruct return motion of the arm 170, as shown in the central dotted position of Figure 6, so that the return motion cannot be initiated until the arm 170 has been moved beyond the last apex 437 of the serrated portion, whereupon the arm 170 is free to be returned to its initial position, the dog 430 swinging in the reverse direction sufficiently to clear the apices of the serrated portion.

Operation

From the foregoing description of the machine, it will be understood that with the control knob 290 set at the "add" position, the operator may depress the number keys in the order of the digits of the number to be added which will cause the selector carriage stops to be set accordingly, and the selector carriage to be moved to the left to an extent depending upon the number of keys depressed. The swinging down of the handle bar 150 by the operator, followed by a rise of this handle, will then cause the totalizer wheels to be rotated each by the amount of the number key depressed for that denominational order, and at each return of the handle 150 the selector stop carriage will be returned to its initial position ready for the next row of figures to be added to the first. This next row is then introduced into the machine by pressing the number keys in the order that these digits appear from left to right, and this number is then added to the preceding by a downward and then upward motion of the handle 150, whereupon the machine is then in condition to receive another set of digits of another number to be added. This action takes place until the desired amount of addition has been accomplished, the total then appearing on the totalizer wheels visible through the sight opening.

After addition has been completed, the machine may be cleared by adjusting the knob 290 to its foremost position and then depressing and raising the handle bar

150. This will return all the totalizer wheels to "0" indication.

When it is desired to subtract, the minuend number is introduced into the totalizer wheels by an adding operation, the digits of the number being introduced by depressing the corresponding number keys and then manipulating the handle 150. The control knob 290 is then moved to "subtract" in its rearward position, and the subtrahend is then introduced into the machine by depressing the number keys in the order of the digits of this number. The handle 150 is then given a downward stroke and released, whereupon the totalizer wheels will indicate the remainder. The machine may then be "cleared" in the same manner as before.

The machine may be made so small and compact that it is convenient for the operator to adjust the knob 290 and to depress the number keys with the fingers of either hand and then to depress the actuator bar 150 by downward and forward pressure of the heel of the same hand, the springs 325 and 164 returning the actuator bar 150 to starting position as soon as pressure from the operator's hand is released. Thus the use of only one hand is necessary to operate the machine, the other hand being free for other use.

From the foregoing description of an embodiment of this invention it will be evident to those skilled in the art that various changes and modifications may be made without departing from its spirit or scope.

I claim:

1. A machine of the class described comprising a bank of coaxially arranged totalizer wheels, a gear for each of said wheels, operatively connected thereto, an actuator for each gear having opposed rack portions on opposite sides of its respective gear, spaced by a distance greater than the maximum diameter of said gear, operator-controlled means for moving said actuators lengthwise of said rack portions by predetermined amounts, means for moving said actuator selectively to bring either of said rack portions of each actuator into mesh with its respective gear or with both rack portions out of such mesh preparatory to such lengthwise motion in one direction, said means for moving said actuator comprising a shaft operatively associated with said actuators and mounted for movement transverse to the length of said racks, an oscillatory cam carried by said shaft and positioned between fixed abutments to raise said shaft and said actuators upon being swung in one direction and to lower them upon being swung in the other direction, means movable by said operator-controlled means for swinging the said cam, said cam swinging means being constructed and arranged to be moved, selectively, into engagement with opposed portions of said cam to swing it in one direction or the other, as desired, and means engaging said cam swinging means and having an extension manipulatable by the operator to move said cam swinging means selectively into engagement with either of the opposed portions of said cam.

2. In a machine of the class described having a totalizer supported for rotation about a fixed axis, differential actuators comprising opposed racks, one or the other of which racks is shifted into operating engagement with the totalizer to effect adding, subtracting or clearing, and a manually operable actuator driving member; the combination of a shaft operatively associated with said actuators and mounted for movement transverse to the length of said racks, an oscillatory cam carried by said shaft and positioned between fixed abutments to shift said shaft and one or the other of said opposed racks into engagement with said totalizer when said cam is swung in one or the other direction, a cam swinging means settable to engage opposed portions of said cam, respectively, and movable to swing it in one or the other direction, manually operable selector means positioned to engage said cam swinging means for selectively setting said cam swinging means in engagement with one or the other of said opposed portions of said cam, and means drivingly connecting said cam swinging means and said actuator driving member, selectively, toward the beginning or the end of the driving stroke of said member.

3. In a machine of the class described having a totalizer supported for rotation about a fixed axis, differential actuators comprising opposed racks, one or the other of which racks is shifted into operating engagement with the totalizer to effect adding, substracting or clearing, and a manually operable actuator driving member, the combination of a shaft operatively associated with said actuators and mounted for movement transverse to the length of said racks, an oscillatory cam carried by said shaft and positioned between fixed abutments to shift said shaft and one or the other of said opposed racks into engagement with said totalizer when said cam is swung in one or the other direction, a cam swinging means settable to engage opposed portions of said cam, respectively, and movable to swing it in one or the other direction, manually operable selector means positioned to engage said cam swinging means for selectively setting said cam swinging means in engagement with one or the other of said opposed portions of said cam, a driven member engageable with said cam swinging means and positioned to be engaged by said driving member toward the end of its driving stroke, and control means operatively associated with said selector means and positionable to drivingly connect said driven member and said driving member towards the beginning of the driving stroke of said driving member.

4. In a machine of the class described having a totalizer supported for rotation about a fixed axis, differential actuators comprising opposed racks, one or the other of which racks is shifted into operating engagement with the totalizer to effect adding, subtracting or clearing, and a manually operable actuator driving member; the combination of a shaft operatively associated with said actuators and mounted for movement transverse to the length of said racks, an oscillatory cam carried by said shaft and positioned between fixed abutments to shift said shaft and one or the other of said opposed racks into engagement with said totalizer when said cam is swung in one or the other direction, a cam swinging means settable to engage opposed portions of said cam, respectively, and movable to swing it in one or the other direction, manually operable selector means positioned to engage said cam swinging means for selectively setting said cam swinging means in engagement with one or the other of said opposed portions of said cam, said selector in a first setting conditioning the machine for an adding operation, a driven member engageable with said cam swinging means and positioned to be engaged by said driving member toward the end of its driving stroke, and control means operatively associated with said selector means and positionable when said selector means is in its said first setting to drivingly connect said driven member and said driving member towards the beginning of the driving stroke of said driving member.

5. In a machine of the class described having a totalizer supported for rotation about a fixed axis, differential actuators comprising opposed racks, one or the other of which racks is shiftable into operating engagement with the totalizer to effect adding, subtracting, or clearing, and a manually operable differential actuators driving member; the combination of an oscillatory cam operatively connected with said differential actuators to shift one or the other of said opposed racks into engagement with said totalizer when said cam is swung in one or the other direction, a cam swinging means settable to engage opposed portions of said cam, respectively, and movable to swing it in one or the other direction, manually operable selector means engaging said cam swinging means, and settable in first and second positions, respectively, for selectively setting said cam swinging means in engagement with one of said opposed portions of said cam to condition the machine for addition and in engagement with the other of said opposed portions to condition the machine for subtraction, a first driven member connected with said cam swinging means and positioned to be engaged by said driving member toward the end of its driving stroke, clearing control means including a second driven member pivotedly supported on said first driven member, said second driven member being positioned to engage and normally pivot free of said driving member towards the beginning of its driving stroke, means operative by said selector in its first position to prevent said second driven member from pivoting free of said driving member, whereby both said driven members are driven by said driving member towards the beginning of its driving stroke.

6. In a machine of the class described having a totalizer supported for rotation about a fixed axis, differential actuators comprising opposed racks, one or the other of which racks is shiftable into operating engagement with the totalizer to effect adding, subtracting, or clearing, and a manually operable differential actuators driving member, the combination of an oscillatory cam associated with said differential actuators to shift one or the other of said opposed racks into engagement with said totalizer when said cam is swung in one or the other direction, two engageable means supported, respectively, at opposed portions on the body of said cam, a cam swinging means settable to engage one or the other of said engageable means, respectively, and movable to swing said cam in one or the other direction, manually operable selector means connected to said cam swinging means and settable in first and second positions, respectively, for selectively setting said cam swinging means in engagement with one of said engageable means to condition the machine for addition and in engagement with the other of said engageable means to condition the machine for subtraction, a first driven member connected with said cam swinging means and positioned to be engaged by said driving member toward the end of its driving stroke, clearing control means including a second driven member pivotedly supported on said first driven member, said second driven member being positioned to engage and normally pivot free of said driving member towards the beginning of its driving stroke, a tiltable plate having a camming surface formed thereon, a pivotedly supported arm having a cam follower positioned thereon to ride on said camming surface, said camming surface being formed to move said arm in position to prevent said second driven member from pivoting free of said driving member when said plate is tilted, whereby both said driven members are driven by said driving member towards the beginning of its driving stroke.

7. In a machine of the class described having a totalizer supported for rotation about a fixed axis, differential actuators comprising opposed racks, one or the other of which racks is shiftable into operating engagement with the totalizer to effect adding, subtracting, or clearing, and a manually operable differential actuators driving member; the combination of an oscillatory cam associated with said differential actuators to shift one or the other of said opposed racks into engagement with said totalizer when said cam is swung in one or the other direction, two engageable means supported, respectively, at opposed portions on the body of said cam, a cam swinging means settable to engage one or the other of said engageable means, respectively, and movable to swing said cam in one or the other direction, manually operable selector means connected to said cam swinging means and settable in first and second positions, respectively, for selectively setting said cam swinging means in engagement with one of said engageable means to condition the machine for addition and in engagement with the other of said engageable means to condition the machine for subtraction, a first driven member connected with said cam swinging means and positioned to be engaged by said driving member toward the end of its driving stroke, clearing control means including a second driven member pivotedly supported on said first driven member, said driving member having first and second spaced apart camming surfaces, said second driven member being positioned to engage said first spaced camming surface towards the beginning of the driving stroke of said driving means and said second spaced camming surface on the return stroke thereof, said second driven member normally pivoting freely to ride over said spaced camming surfaces, a tiltable camming plate having a camming surface formed thereon, two pivotedly supported arms, each arm having a cam follower positioned thereon to ride on said camming surface, said camming surface being formed to move, when said plate is tilted, one said arm in position to prevent said second driven member from pivoting free of said first spaced camming surface, whereby said driven members are driven by said driving member towards the beginning of its driving stroke, and to move the second said arm in position to prevent said second driven member from pivoting free of said second spaced camming surface on said driving member on the return stroke thereof, whereby said driven members are returned to their initial positions.

References Cited in the file of this patent

UNITED STATES PATENTS

| | | |
|---|---|---|
| 605,909 | Peters | June 21, 1898 |
| 904,561 | Pike | Nov. 24, 1908 |
| 1,001,688 | Rinsche | Aug. 29, 1911 |
| 1,016,287 | Perkins | Feb. 6, 1912 |
| 1,154,150 | Wiberg | Sept. 21, 1915 |
| 1,195,567 | Draughon | Aug. 22, 1916 |
| 1,285,014 | Brown | Nov. 19, 1918 |
| 1,318,397 | Malcher | Oct. 14, 1919 |
| 1,371,138 | Bair | Mar. 8, 1921 |
| 1,385,700 | Milinowski | July 26, 1921 |
| 1,580,492 | Johantgen | Apr. 13, 1926 |
| 1,899,444 | Mehan | Feb. 28, 1933 |
| 2,034,345 | Kottmann | Mar. 17, 1936 |
| 2,048,453 | Kall | July 21, 1936 |
| 2,062,963 | Benninger | Dec. 1, 1936 |
| 2,130,723 | Kottmann | Sept. 20, 1938 |
| 2,153,299 | Dahlberg | Apr. 4, 1939 |
| 2,210,099 | Shipley | Aug. 6, 1940 |
| 2,277,498 | Mehan | Mar. 24, 1942 |
| 2,303,692 | Hellgren | Dec. 1, 1942 |
| 2,308,940 | Sundstrand | Jan. 19, 1943 |
| 2,346,834 | Friden | Aug. 18, 1944 |
| 2,486,959 | Mehan | Nov. 1, 1949 |
| 2,583,810 | Boyden | Jan. 29, 1952 |